No. 876,074. PATENTED JAN. 7, 1908.
W. R. MERSHON.
SAFETY DEVICE FOR RAIL CONNECTIONS OF DRAWBRIDGES.
APPLICATION FILED JULY 17, 1907.
3 SHEETS—SHEET 1.
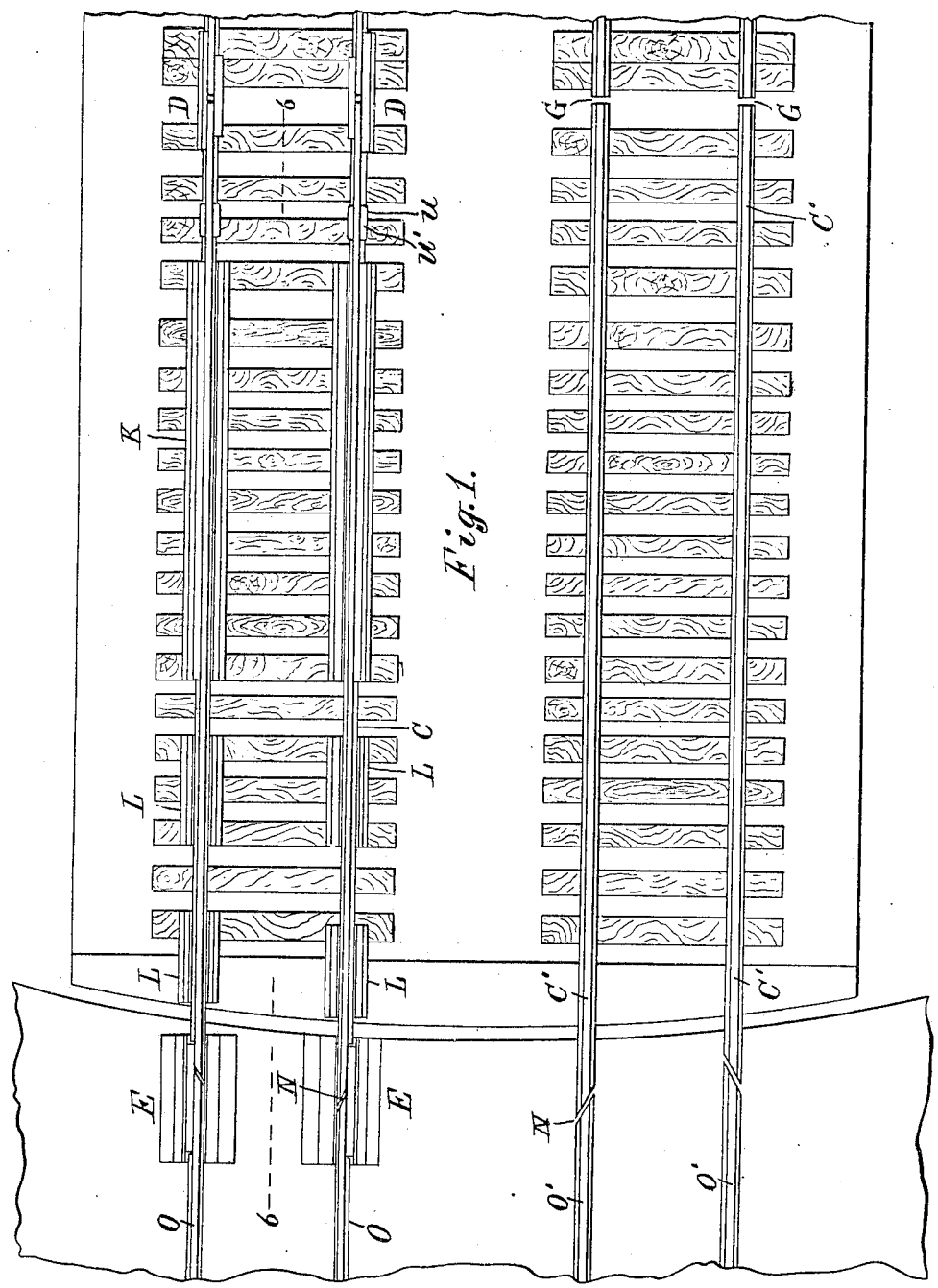

No. 876,074.
PATENTED JAN. 7, 1908.
W. R. MERSHON.
SAFETY DEVICE FOR RAIL CONNECTIONS OF DRAWBRIDGES.
APPLICATION FILED JULY 17, 1907.
3 SHEETS—SHEET 2.
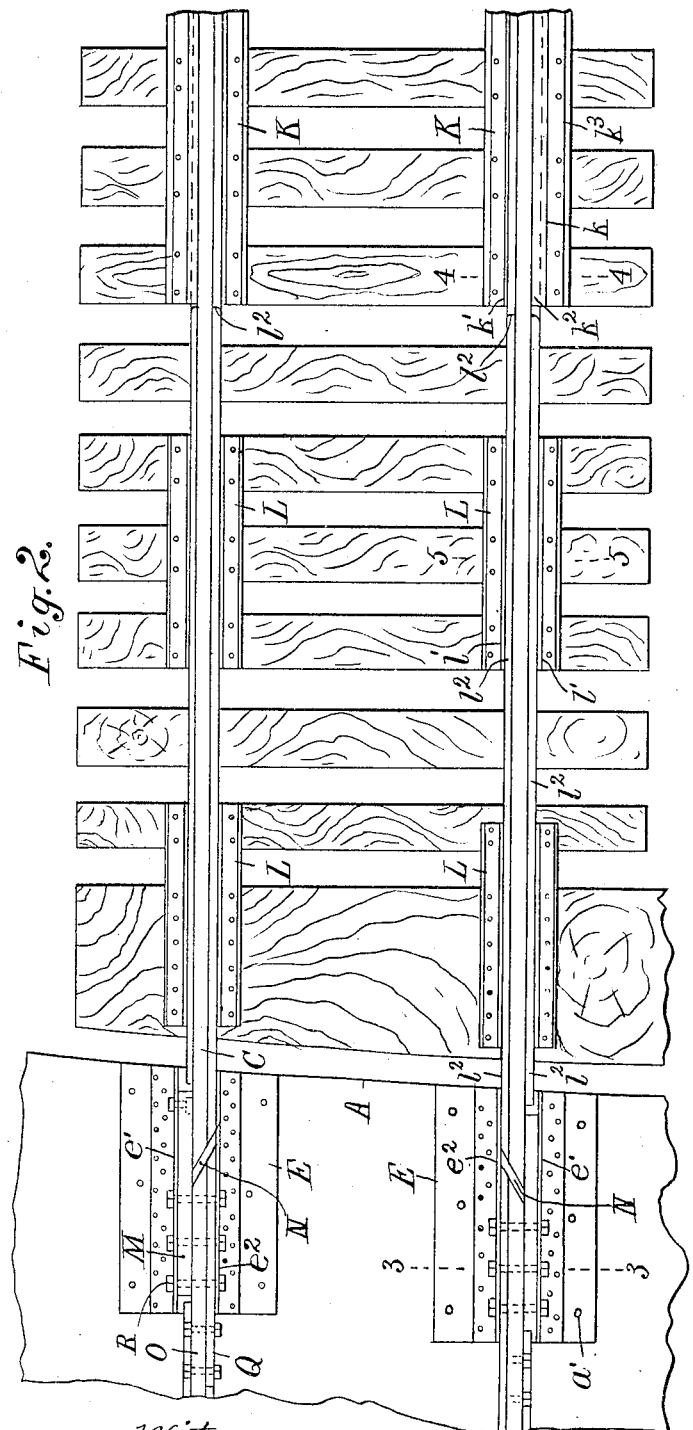
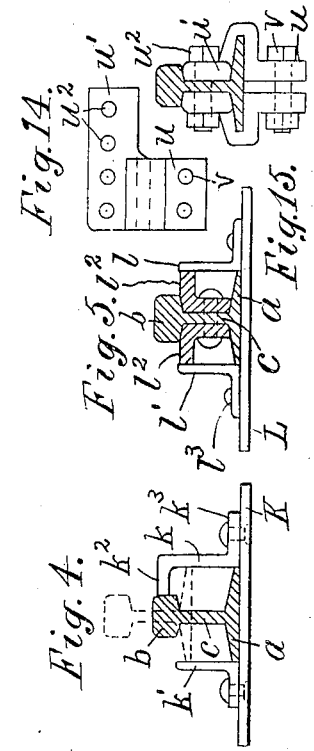
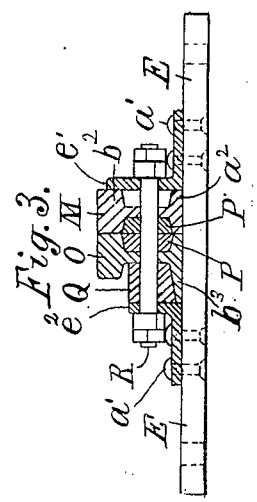
Witnesses:
L. Lee.
J. W. Greenbaum
Inventor.
William R. Mershon,
per Thomas S. Crane, Atty.

No. 876,074. PATENTED JAN. 7, 1908.
W. R. MERSHON.
SAFETY DEVICE FOR RAIL CONNECTIONS OF DRAWBRIDGES.
APPLICATION FILED JULY 17, 1907.
3 SHEETS—SHEET 3.
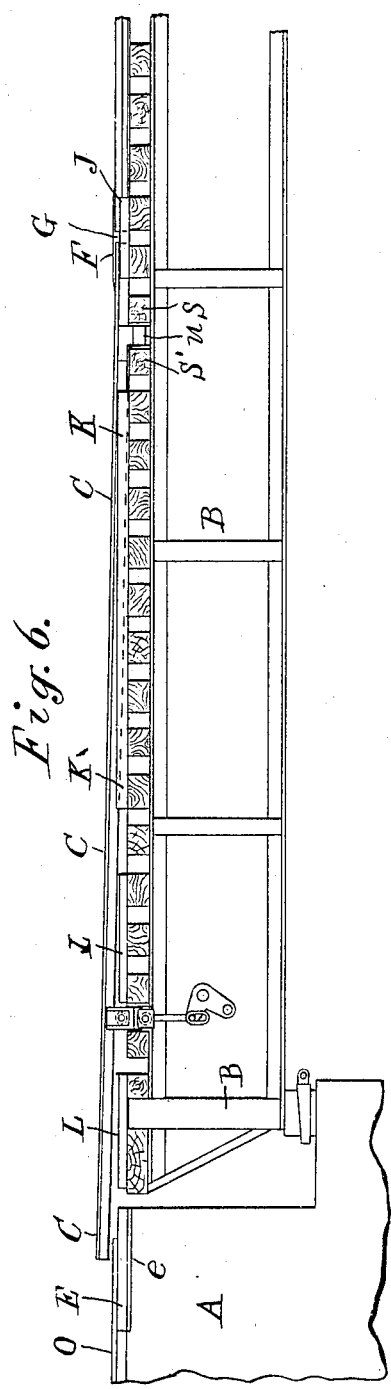
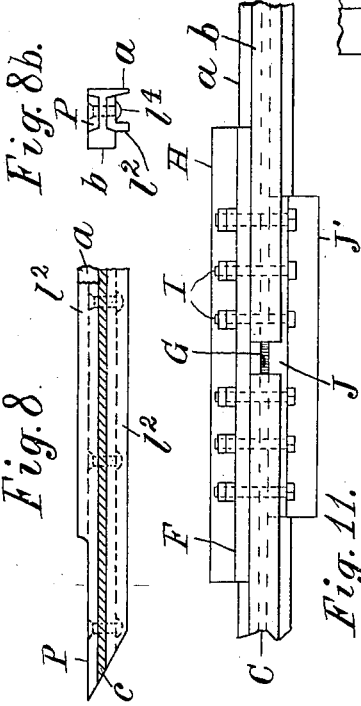
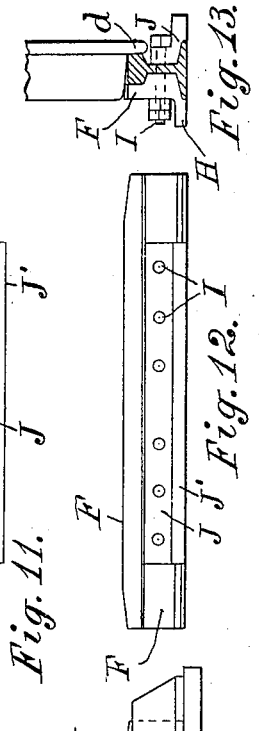
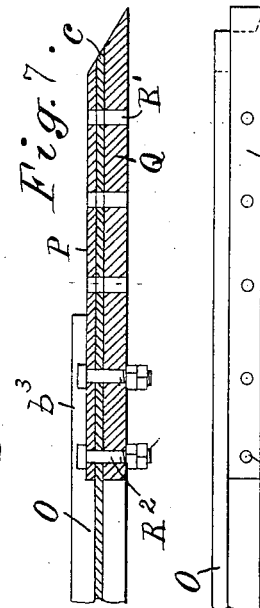
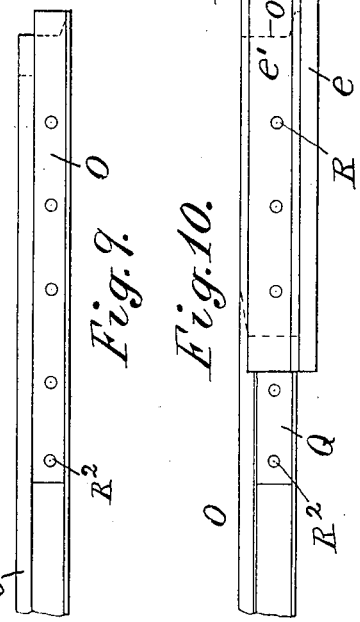
Witnesses:
L. Lee.
J. W. Greenbaum
Inventor,
William R. Mershon,
per Thomas S. Crane, Atty.

UNITED STATES PATENT OFFICE.

WILLIAM R. MERSHON, OF NEWARK, NEW JERSEY.

SAFETY DEVICE FOR RAIL CONNECTIONS OF DRAWBRIDGES.

No. 876,074. Specification of Letters Patent. Patented Jan. 7, 1908.

Application filed July 17, 1907. Serial No. 384,260.

*To all whom it may concern:*

Be it known that I, WILLIAM R. MERSHON, a citizen of the United States, residing at Newark, county of Essex, and State of New Jersey, have invented certain new and useful Improvements in Safety Devices for Rail Connections of Drawbridges, fully described and represented in the following specification and the accompanying drawings, forming a part of the same.

The object of this invention is to lock most firmly in place the rails upon a drawbridge which make a joint with the corresponding rails upon the landing, and to strengthen the rails upon the drawbridge which make such joint, and which are commonly raised at one end, to clear the head-block joint, when turning the bridge.

The locking devices for the joint consist of filling pieces clamped to the sides of the rail, to stiffen and brace the same, and a head-block on the landing constructed to embrace the joint of the rails, and having an open box or channel to receive the ends of the rails and their stiffeners.

The means used to strengthen the movable rails, and to brace them against lateral thrust, consists of filling pieces bolted to the web of the rail, and open topped boxes of several kinds adapted to receive the rails thus strengthened and their fillers, and support them firmly against lateral strain.

The invention also includes a tread-piece in each rail-joint, arranged to cover the joint of the rails upon the other side, especially when they are separated by contraction, and to support the tread of the car-wheel when rolling over the joint.

The invention will be understood by reference to the annexed drawing, in which

Figure 1 is a plan of the end of a drawbridge with the invention applied to the rails at one side of the center line; Fig. 2 shows upon a larger scale a single track with the fixtures adjacent to the landing; Fig. 3 is a section of the head-block on line 3—3 in Fig. 2; Fig. 4 is a section of the long rail-guide on line 4—4 in Fig. 2; Fig. 5 is a section of the intermediate guide-box on line 5—5 in Fig. 2; Fig. 6 is a section on line 6—6 in Fig. 1; Fig. 7 is a horizontal section of the reinforced rail-end upon the landing; Fig. 8 a longitudinal section of the movable rail-end just below the rail head in Fig. 9; Fig. 8$^b$ is an end view of the movable rail. Fig. 9 is a side view of the rail-end upon the landing; Fig. 10 is a side view of the head-block with such rail-end; Fig. 11 is a plan of the track-joint with the tread-piece at one side; Fig. 12 is a side view of the track-joint fixtures and Fig. 13 is an end view of the same. Figs. 14 and 15 are a side and end view of the stop $u$.

The landing A is shown in Fig. 1 adjacent to the end of the drawbridge B, the latter being wide enough for two tracks C and C'. The track C is shown with a track-joint D from which the rails extend at the right toward the other end of the bridge, and at the left to the head-block E upon the landing. The rails C are movable upward at the head-block, being fixed at the joint D but loose at all other points. This joint is marked "D" only in Fig. 1, its separate parts being otherwise marked in Figs. 6, 11, 12 and 13. This rail-joint is formed with a fish-plate of extra thickness having a flange or rib F projected upward at the outer side of the rail and extended a little above the top of the same, so as to form a tread-piece and receive and support the wheel when it rolls over the opening G between the ends of the rails. Such opening is necessary to permit the expansion of the rails in hot weather, and the rib F forms a tread upon the fish-plate which prevents the collision of the wheel with the ends of the rails as the wheel passes the joint.

The pressure of the wheel upon the rib F is transmitted to the rail-seat below by a flange H at the foot of the fish-plate, and the flange and body of the fish-plate are fitted snugly into the side of the rail, and bolted thereto by bolts I and a clamp-plate J having also a foot J'. The bolt-holes in the rails are elongated, to permit the rails to shift under expansion, but the rail-joint forms a firm support for the rail and for the wheel tread as the wheel rolls over the joint.

The head-block is formed with a heavy bed E and two vertical flanges $e'$ and $e^2$, the flange $e'$ being high enough to support laterally a tread-piece M at the side of the joint N between the ends of the movable rail C and the fixed rail O in the head-block. The tread-piece is formed of a piece of steel T-rail with the bottom flange $a^2$ trimmed even with the sides of the head $b^2$, the material of such rails being of better quality than any casting. The adjacent side of the rail O, next the tread piece, has the flange $a$ trimmed in a similar manner, and a filler or fillers P is or are secured between the webs of the two rails and the tread-piece; so that the webs are rigidly supported when the parts are clamped together (see Figs. 2 and 3). To make such clamping firm and rigid, a filler Q is applied against the web of the rail O upon the inner side, below the path of the wheel-flanges. Such filler extends to the edge of the rail-flange $a$, and the flanges $e'$ and $e^2$ of the head-block are spaced apart so as to snugly embrace all these parts, so that they may be rigidly held in the head-block by cross-bolts R. The fillers P and Q greatly strengthen the end of the rail O, and furnish a rigid mass of metal which is held most firmly in the head-block by the extension of the bolts R through all the parts.

Intermediate to the rail-joint and the head-block are special rail-guides K and L, which hold the rail in line where the wheels pass over it, and yet permit it to be lifted when the draw is opened. The rail-guide K is next to the joint D, where the rails are lifted the least, and is formed with vertical flanges $k$ and $k'$ at the opposite edges of the rail-flange $a$. The extreme upward movement of the rail is here less than its own height, and thus permits a horizontal integral lip $k^2$ to be extended from the outer flange $k$ into contact with the outer side of the rail, to resist the crowding of the wheel-flanges $d$ against the head $b$ of the rail. (See Fig. 4.) The flange $k$ has an integral foot $k^3$ extended its whole length, by which it is riveted securely to a foot-plate K; the flange $k'$ being similarly secured to the foot-plate. Unlike the guide K, the rail-guides L are wholly open on the top, so that the rail can lift out of the same when elevated, as shown in Fig. 6, and are formed in short sections, so as to be applied to guide the rail at intervals. The guide K is extended along the rail as far as the upward movement of the rail will permit, but the rails have a special attachment to coöperate with the guides L, as the flanges $a$ of the rails must move between the flanges $l$ and $l'$ of these guides, and no lip can be formed on the guide. To support the head of the rail when in this guide, I secure angle-plates $l^2$ to the web $c$ of the rail, upon its opposite sides, with enough projection from the rail-head $b$ to touch the flanges $l$, $l'$ of the guide, and far enough below the top of the head to clear the wheel-flanges, and thus sustain the rail most rigidly when supporting the wheels. The angle-plates $l^2$ extend along the movable rails from the guide K to the head-block E.

The end of the rail C where it fits within the head-block, is also strengthened by means of angle-plates $l^2$ shown in Fig. 8, the flange of the angle-plate next the tread-piece M being trimmed away to the side of the rail-head, so as to drop into the head-block at the side of the tread-piece M, as indicated in Fig. 2. In Fig. 8 the head of the rail C is omitted, so as to exhibit the angle-plates, and the filler which is marked P; the foot of the angle-plate $l^2$ forming the filler P on the side of the rail, where the flanges are trimmed away. The angle-plates $l^2$ project from one side of the rail the same amount as the filler Q, and the free end of the rail C thus exactly fits in the head-block at the end of the rail O.

No strength can be too great to continuously resist the impact of heavy locomotives and cars, and the assemblage of stiffened rail-ends in the head-block is therefore no stronger than is required; although much stiffer than any other construction having a lifting rail. By the head-block and these two forms of guide, each adapted to a particular part of the movable rail, the rails upon the drawbridge are firmly supported, when the wheels pass over them. The fixtures described can be used to strengthen the rails and their joints upon either a single or double-track drawbridge. To hold the lifting-rail from longitudinal movement, when the car-wheels strike it, it is customary to clamp a stop on the rail, and fit the same between two of the ties S, S', (see Fig. 6) and the present invention furnishes a means of setting or securing such a stop $u$ upon the rail in slightly different positions, with the same bolt-holes. This is effected, as shown in Fig. 14, by forming the top of the stop with a lateral extension $u'$ which is secured to the rail by nuts and bolts $u^2$; a projection of the step from the rail at a slightly different point being secured by removing the halves of the stop from the rail and reversing them; applying each half to the side of the rail opposite to that occupied before, and re-fastening them by the bolts $u^2$. When properly adjusted, the halves are also united by the usual bolts $v$ extended through the stop itself. This construction compensates for slight variations or errors in forming the bolt-holes in the rail, or in the location of the cross-ties.

From the above description, it will be seen that the invention furnishes a series of attachments for the rails upon the bridge, and a firm and rigid means for connecting the bridge-rails with the rails on the landing.

It will be noticed, in Fig. 4, that the flange $k$ is integral with the lip $k^2$ and the foot $k^3$, so that the lip is held most rigidly; much more so than would be possible with two angles riveted together, as has sometimes been done to form a Z-shaped bar; and I have therefore made a special claim to such construction.

What I claim herein is:

1. In a drawbridge having a lifting rail, the rail-joint D having, on the outer side of the rail, the rib F arranged to support the wheel-tread when passing over the joint.

2. In a drawbridge having a lifting rail, the rail guide K having the vertical flanges $k$ and $k'$ fitted to the opposite side edges of the rail-flange, the flange $k$ having an integral horizontal lip $k^2$ and an integral foot $k^3$, and adjusted to hold the integral lip $k^2$ in contact with the side of the rail-head.

3. In a drawbridge having a lifting rail, the rail-guide L having the two vertical flanges $l$ and $l'$, combined with a lifting rail having the angle-plates $l^2$ secured to its web and fitted to the inner sides of the said flanges.

4. In a drawbridge having a lifting rail, the combination, with lifting rail having the angle-plates $l^2$, of the rail-joint D, the rail-guide K arranged upon the rail where it lifts less than its own height, and the rail-guide L fitted to the rail where it lifts more than its own height.

5. In a drawbridge having a lifting rail, the head-block receiving the joint of the land-rail and the lifting rail, and provided with the tread-piece M, formed of T-rail cross-section, to support the wheel-tread when passing over the joint in such head-block.

6. In a drawbridge having a lifting rail, the head-block provided with the tread-piece M, the bridge-rail C having fillers upon the sides to stiffen the same, the land-rail O having fillers upon opposite sides, and the flanges $e'$ and $e^2$ spaced apart upon the bed of the head-block, to snugly embrace the said parts.

7. In a head-block for the drawbridge rail-joint, the combination, with the landing rail O having fillers on opposite sides, of the tread-piece M with means for securing such rail in the head-block with the tread-piece, and the lifting-rail C having fillers on opposite sides and fitted to the space in the head-block at the side of the tread-piece.

8. In a drawbridge, the combination, with the lifting-rail C, having bolt-holes for the attachment of a stop, of the stop $n$ made in halves to fit the opposite sides of the rail-web, and having the top of the stop at one side provided with the lateral extension $u'$ having bolt-holes corresponding with the holes in the web, and adapted to adjust the stop in two positions when reversely applied to the rail.

In testimony whereof I have hereunto set my hand in the presence of two subscribing witnesses.

WILLIAM R. MERSHON

Witnesses:
   THOMAS S. CRANE,
   F. C. FOSTER.